FIG.1 FIG.2 FIG.3 FIG.4
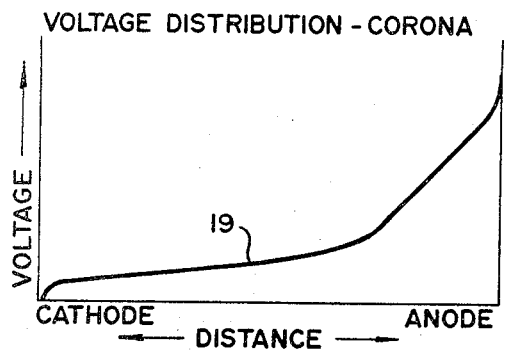
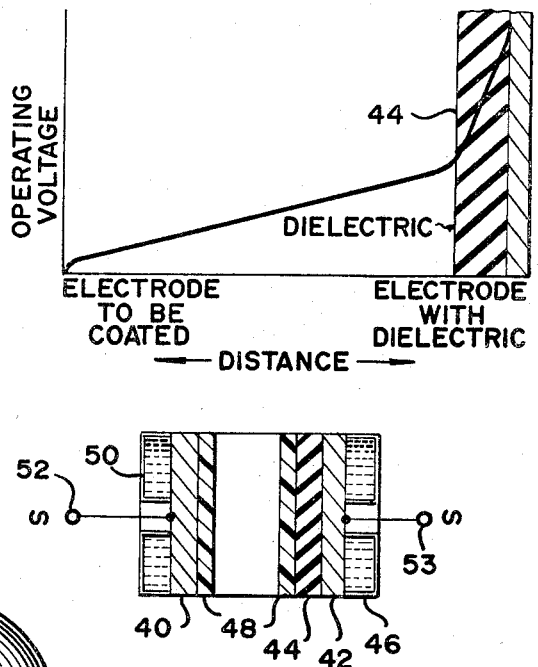
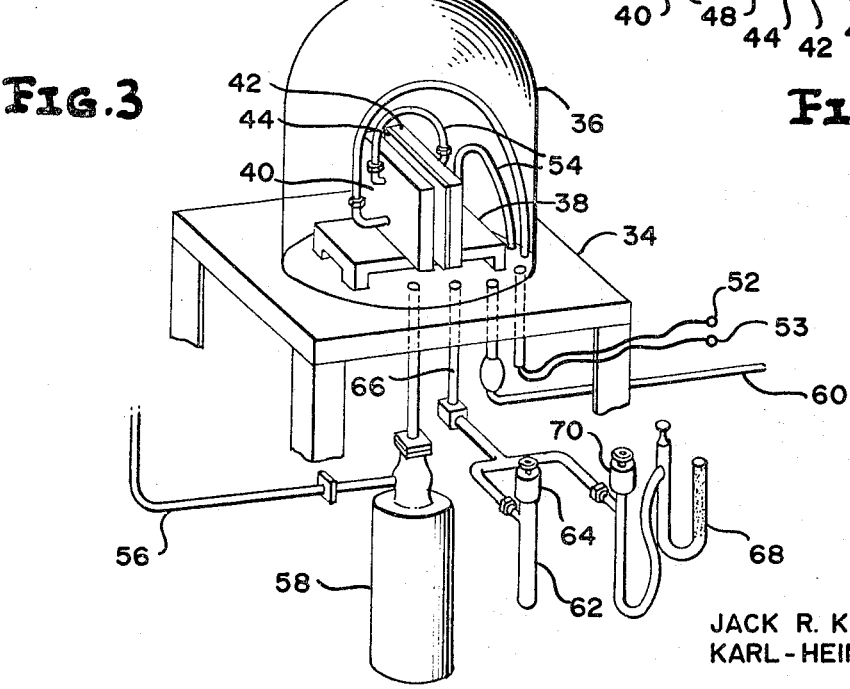
INVENTOR
JACK R. KNOX &
KARL-HEINZ TEUMER
ATTORNEYS

INVENTOR
JACK R. KNOX &
KARL-HEINZ TEUMER

United States Patent Office 3,421,930
Patented Jan. 14, 1969

3,421,930
CONDENSATION OF MONOMER AND LOW
N-MER VAPORS TO INCREASE POLYMERI-
ZATION RATES IN A CORONA DISCHARGE
Jack R. Knox, Wilmington, Del., and Karl-Heinz Teumer,
Chicago, Ill., assignors to Continental Can Company,
Inc., New York, N.Y., a corporation of New York
Filed Aug. 13, 1965, Ser. No. 479,456
U.S. Cl. 117—93.1                                                    7 Claims
Int. Cl. B01k 1/00

ABSTRACT OF THE DISCLOSURE

A polymeric coating is formed on a substrate by exposing the substrate to the atmosphere of a gaseous polymerizable monomer, the substrate being maintained at a temperature below the condensation temperature of the gaseous monomer and inducing the polymerization by a corona discharge operating at a pressure at least equal to atmospheric.

---

This invention relates to the polymerization of monomer and low n-mer vapors and more specifically to the condensation of monomer and low n-mer vapors for increasing polymerization rates through the utilization of a spark or corona type discharge.

In general, the use of certain electrical phenomena to produce polymerization of many substances is known. This invention relates to a method for forming films of solid organic material upon the surface of a substrate through the use of an electrical discharge which discharge is maintained in what is believed to be the sparking or, perhaps the corona region of the electrical phenomenon.

Stable electrical discharges may be broadly classified as corona, glow and arc. Each of these types of discharges is distinctly different and characterized by unique voltage-current parameters which exist during the particular discharge. Corona may be defined as any field induced ionization that does not result immediately in complete breakdown of the insulation-electrode system in which it occurs. Further, corona may be defined as a faint illumination adjacent to the surface of an electrical conductor at sufficiently high voltage that results from electrical discharge and indicates an early stage of electrical breakdown in the surrounding air or gas. If a potential difference is established between smooth parallel wires or plates, or between concentric cylinders, and the potential difference is gradually increased, a voltage is finally reached at which a hissing noise is heard. If the environment is sufficiently dark, a pale illumination, called the electric corona, will be seen to surround the wires or appear between the plates. If the potential difference is increased further, mobile streamers will be observed in the illumination. The discharge is brought about as a result of the ionization of the gas surrounding the conductor which occurs when the potential gradient exceeds a certain value but is not sufficient to cause sparking. Corona is further characterized by relatively high voltages and relatively low currents. Corona may occur at reduced pressures or most commonly at atmospheric pressure. The space potential gradient at the cathode of corona discharge is much lower than that at the anode.

On the other hand, a glow discharge may be defined as a silent discharge without sparks and having a space potential gradient in the vicinity of the cathode which is considerably higher than the ionization potential of the gas. The typical structure of the glow discharge is identified by a steep potential gradient at the cathode and operating primarily by electron liberation by positive ion bombardment at the cathode. In relation to the corona discharge, a glow discharge is characterized by a higher current than the corona discharge.

The arc discharge is classified as a substantially complete ionization and breakdown between the electrodes and producing a very high current at low voltages.

In the present invention, the classification of the type of electrical discharge is difficult due to the problem of measuring the potential drop across the gap or the dielectric barrier. However, it can be said that the type of discharge is not of the glow type since glow is very difficult to maintain at the atmospheric pressure at which the present invention is practiced. Under ideal laboratory conditions, a glow discharge may be momentarily maintained at atmospheric pressure but could not be sustained to practice the invention. According to researchers previously working in this field, a discharge produced in a cell with a dielectric barrier in front of one electrode is called a semi-corona discharge. This implies that the discharge is of the corona type characterized by high voltage and low current. Thomas (Thomas et al., Chemical Reviews 28 (1):170, February 1941, "Reactions of Hydrocarbons in Electrical Discharges") refers to these discharges as non-disruptive or silent discharges. However, from visual observations of the reaction cell of the present invention, it is believed that the invention actually employs a spark discharge (current-limited arc discharge) which Thomas (supra) defines as a disruptive discharge. These discharges are characteristically of the low voltage-high current type. Due to the difficulty in proving or disproving this hypothesis because of the problem in measuring the actual potential drop across the dielectric barrier, the hypothesis is reinforced by the fact that discharge streamers formed in the cell extend across the entire width of the gap between the dielectric barrier surrounding the inner electrode and the outer electrode. These streamers, which are narrow streams of charged particles flowing across the gap, are known to be characterized by low potential drops in other type systems.

Although it is well knows that a disruptive discharge is accompanied by high temperature zones in and near the discharge which are destructive to organic coatings on the surfaces of the electrodes, the practice of the present invention actually results in dancing of the spark discharges. Before destruction of the coating is thermally achieved at the terminal point of a streamer, the streamer is extinguished by the deposition of the organic dielectric barrier and re-initiated at a nearby point where the electrode surface is not coated. Observation of this phenomenon gives the impression that the streamers are dancing in the gap. This effect has the advantage of not only preventing thermal destruction to the coating, but also causes reasonably uniform depositions over the entire outer electrode surface. Further experimentation which lends credence to the foregoing hypothesis results from the fact that if an outer electrode with an organic coating already applied is utilized for the experiments, destruction of the coating and erosion of the electrically conductive substrate occurs at a limited number of points on the surface because of the elimination of the dancing effect. This indicates that the streamers are high-energy thermally hot zones which occur at points on the outer electrode surface not protected by the dielectric coating.

Thus, the present invention relates to the utilization of an electrical discharge for increasing the polymerization rate of a condensed monomer vapor or low n-mer upon a substrate. The temperature of the electrode substrate is controlled so that maximum polymerization rate is attained consistent with a high degree of adherence and uniformity of the polymerized material upon the substrate. An early discovery was that many organic and non-organic gaseous substances, as well as liquid substances, were modified, degraded or thickened by a discharge of sufficient intensity. Thus, gaseous substances, such as methane, ethane, benzene, and in general the lower alkane gases, have been utilized to produce both liquid and solid products by causing various types of discharges to occur through a body of such gas. Polymerization of such monomers as styrene, methylmethacrylate, allylmethacrylate, divinyl benzene, butadiene, other compounds, and mixtures of the foregoing, is known. The use of an electrical discharge in an atmosphere of an organic vapor, such as those set forth, in order to produce a solid, continuous film on an electrode or some substrate in contact with the electrode, has achieved some degree of success. One of the problems in the commercial use of this technique is to obtain a film at a reasonable deposition rate. It is a salient feature of the present invention to teach that by the use of electrode or substrate temperatures below the condensation temperature of the organic vapor, and by employing a certain type of electrical discharge, the deposition rate of the polymerized material on the electrode or substrate can be substantially increased.

Gases or vapors are always adsorbed at a thickness of a few molecules on the surface of a material exposed to the gas or vapor. The lowering of the temperature will generally increase this thickness to a minor degree. Electrical discharge polymerization may be employed to cause an ionization of the gas in the area between the electrodes and, thus, cause the activated molecule or ion to impinge upon the cathode or other substrate. Part of the energy of this ion or activated molecule initiates a polymerization with the adsorbed, unactivated gas or vapor. The major part of the energy of this reaction is dissipated as heat at the electrodes thus raising the temperature. This rise in temperature decreases the thickness of the adsorbed gas or vapor layer, and, thus, decreases the number of unactivated molecules available for polymerization by the ions or activated molecules being propelled against the electrode.

By circulation of a coolant through the electrode in contact with the substrate to be coated, the heat generated by impingement of the ions or activated molecules may be removed. If the temperature is lowered sufficiently, the vapor molecules will condense to a liquid on the substrate, in addition to the thin layer developed by adsorption. This greatly increases the number of unactivated molecules available for polymerization. During the course of a run at condensation temperatures, the cathode and condensed material may be heated due to the impingement of the activated molecules so that longer flow periods of the gas do not necessarily give unit time rates which are equivalent to shorter periods of exposure to the discharge. In addition, if the substrate is cooled to too low a temperature so that too thick a liquid layer is formed, the polymer will be formed only at the surface or may be of low molecular weight and will not remain as a coating, but will separate from the substrate upon subsequent warming.

Accordingly, it is the principal object of the present invention to improve polymerization techniques through the use of an electrical discharge.

It is a further object of the present invention to improve polymerization techniques through the use of an electrical discharge to activate molecules capable of initiating polymerization.

It is a further object of the present invention to improve polymerization rates by the use of electrode cooling to increase condensation at the electrode.

It is a further object of the present invention to improve polymerization techniques through the use of an electrical discharge to activate molecules capable of initiating polymerization of molecules condensed upon a substrate.

It is a further object of the present invention to improve polymerization techniques by maintaining a substrate at a temperature below the condensation temperature of a gas or vapor to cause the gas or vapor to condense thereon and then initiating an electrical discharge about the substrate for activating gas molecules to initiate polymerization of the condensed gas on the substrate.

It is a further object of the present invention to improve polymerization techniques through the use of an electrical discharge operating at atmospheric pressure for activating molecules capable of initiating polymerization.

It is a further object of the present invention to provide a substrate coated with a polymer in which polymerization is induced by an electrical discharge.

It is a still further object of the present invention to provide a substrate coated with a polymer having a high degree of adherence to the substrate under conditions of flexing and bending.

In a preferred embodiment of the invention, a center electrode is surrounded by a cylindrical dielectric having a closed end and an open end, such as a dielectric of quartz. A fluid having moderately low electrical resistivity is circulated within the cylindrical dielectric and in contact with the center electrode. A cylindrical outer electrode is concentric and in spatial relationship to the dielectric housing the center electrode. The outer electrode is cooled and maintained below the condensation temperature of the monomer, low n-mer, or material in which polymerization is desired. The gas or vapor of the material to be polymerized is then introduced at atmospheric pressure in the area between the quartz dielectric and the outer electrode. In a very short period of time, a thin layer of a few molecules thickness of the material to be polymerized will condense on the cooled outer electrode and a potential is then applied across the electrodes. The resulting electric field set up between the electrodes produces ionization of the incoming or non-condensed material causing these molecules to be activated and to be propelled against the outer electrode with a force sufficient to commence polymerization of the condensed material already present on the outer electrode. Care is exercised with the electrical parameters to maintain the electrical discharge between the electrodes with what is believed the spark region. As the coating of polymerized material builds up on the outer electrode the discharge will produce activated molecules or ions which may either cause polymerization with unactivated molecules on the cooled outer electrodes or may polymerize with other activated molecules and, thus, build up the polymer coating on the center electrode or substrate. In addition, the activated molecules or ions may react with unactivated molecules in the gas or vapor, producing low n-mers which may be deposited and further polymerized on the electrode surface.

The foregoing embodiment employing cylindrical electrodes and dielectrics, may be modified for use with parallel plate electrodes. The same sequence of operations is maintained except that the polymer is now formed on both electrodes or substrates when both are cooled below the condensation temperature of the vapor to be polymerized. In addition, the pressure in either of the embodiments may be maintained above or below atmospheric as found convenient to produce a coating having high adherence and flexibility while being produced at a reasonably high deposition rate. A significant feature of either embodiment is that the electrical discharge be maintained within what is believed to be the spark region so as to achieve the objects set forth in the invention.

The invention, both as to its organization and method of operation, together with further objects and advantages thereof, will best be understood by reference to the following specification taken in conjunction with the accompanying drawings in which:

FIGURE 1 is a graph showing the voltage distribution in the space between the cathode and the anode of a corona discharge;

FIGURE 2 is a graph of potential gradient between the pair of electrodes, one electrode supporting a dielectric barrier;

FIGURE 3 is a perspective view of an apparatus for carrying out the process of the present invention in which flexible and highly adherent polymer coatings may be deposited upon a metal substrate or electrode;

FIGURE 4 is a cross-sectional view of parallel plane electrodes;

Figure 5:
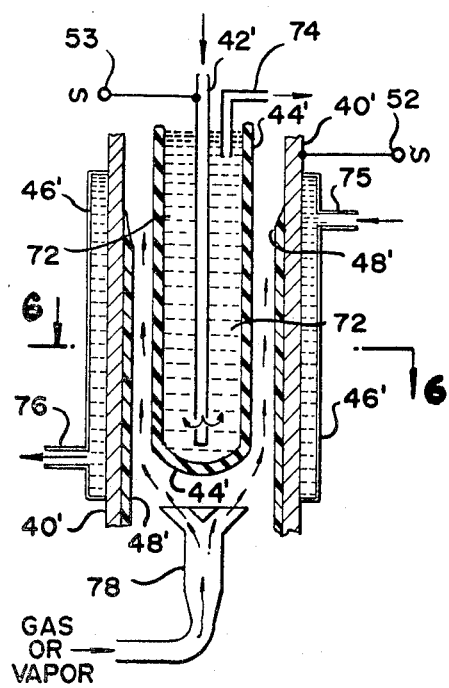
FIGURE 5 is a cross-sectional elevation view of a cylindrical electrode arrangement.

Throughout the FIGURES 2, 7, 8 and 9 which illustrate various graphs of operating parameters, the proportional representation has been drawn for demonstrative purposes and not for a true representation of the stated quantities or electrical parameters. The graphs are intended to show the various relationships between the parameters selected for the respective ordinate and abscissa.

In the FIGURE 1, the voltage distribution in the corona region between the cathode and the anode is illustrated. The discharge of the FIGURE 1 shows a very low potential gradient at the cathode (the polarity will reverse each cycle) along the curve 19 which levels off in the area between the electrodes and then climbs to the operating potential as the distance approaches the anode.

The potential gradient is shown in the FIGURE 2 as it exists between the two electrodes at the peak of any half-cycle of the alternating voltage. The voltage is substantially linear from the outer electrode to the surface of the dielectric. At the surface of the dielectric, the voltage gradient rises very sharply due to the dielectric surrounding the center electrode. The operating voltage may be in the range of 5,000 to 50,000 volts at a frequency of 3,000 to 100,000 cycles per second.

An apparatus for conducting the process of condensation of monomer or low n-mer vapors to increase polymerization rates in a discharge is shown in the perspective view of the FIGURE 3. Although parallel plane electrodes are shown in the FIGURE 3, it will be readily understood that concentric cylindrical electrodes, such as those shown in the FIGURES 5 and 6, may be employed. The apparatus of the FIGURE 3 is supported by any suitable means, such as the base member 34. Although the condensation of the monomer vapors to increase the polymerization rates in the discharge region may be conducted at atmospheric pressure, a bell jar 36 is provided in the event that other pressures are desired. A sample holder 38 is provided upon the base member 34 to support a pair of electrodes 40 and 42. A dielectric 44 is positioned between the electrode 40 and the electrode 42 and in substantial contact with the electrode 42. The electrodes 40 and 42 and the dielectric 44 are shown in detail in the FIGURE 4.

As shown in the FIGURE 4, the parallel plane electrodes 40 and 42 are in spatial relationship and separated by a distance, as shown. The dielectric 44 is in intimate contact with the electrode 42 and a cooling jacket 46 surrounds one side of the electrode 42 thus, also cooling the dielectric 44. A cooling jacket 50 is positioned adjacent the electrode 40 to maintain the electrode 40 below the condensation temperature of the monomer to be polymerized. A coating 48 is shown adhering to the electrode 40 and the dielectric 44 which, in accordance with the principles of the present invention, has condensed and polymerized through the action of the electrical discharge. A suitable source of fluid coolant may be circulated through the cooling jackets 46 and 50 to maintain the desired temperature of the respective electrodes and/or dielectric and substrates. A suitable source of alternating voltage, preferably in the 5,000 to 50,000 volt range and in a frequency range of 3,000 to 100,000 cycles per second would be applied to the conductors 52 and 53, as shown. The ionization of the monomer molecular would cause the molecule to become an activated molecule and be driven toward the electrode that was negative during that half-cycle, and to become part of the polymerized coating 48. Any electrons would be attracted toward the electrode that was positive during that half-cycle.

With reference again to the FIGURE 3, cooling fluid would be directed to the cooling jackets 46 and 50 of the FIGURE 4 via a cooling conduit 54. It will be understood that the fluid may be a heated fluid and its temperature will vary according to the monomer or low n-mer employed. Electrical conductors 52 and 53 would be connected to the electrodes 40 and 42, respectively. The pressure within the chamber or bell jar 36 is maintained via a line 56 which is coupled through the base member 34 and externally to a Dry Ice-acetone trap 58, as shown.

A pair of thermocouple leads 60 could be affixed to any area in which it is desired to determine the temperature, for example, the electrode 40. The monomer to be condensed and polymerized may be contained in a reservoir 62 and metered by a metering valve 64. The vapor monomer or low n-mer may be conducted to the area between the electrodes via a conduit 66. A moisture absorber may be contained in the U-shaped arrangement 68 and connected to an air bleed valve 70 which is then connected to the monomer conduit 66 for entry into the area between the electrode 40 and the dielectric 44 on the electrode 42.

Figure 6:
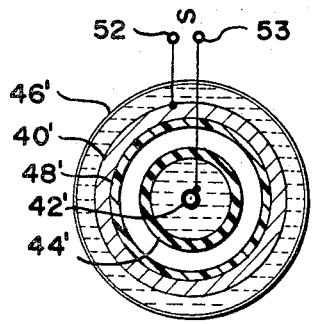
FIGURE 6 is a sectional view taken along the lines 6—6 of FIGURE 5.

In place of the parallel plane electrodes of the FIGURES 3 and 4, concentric electrodes may be employed as shown in the FIGURES 5 and 6. An electrode 42' is directed downwardly and surrounded by a cylindrical or tubular element 44' of dielectric material and closed at its lower end. A solution 72 of moderate or high electrical conductivity is contained within the dielectric material 44' and surrounding the electrode 42'. If a coating is desired on the dielectric 44', then the solution 72 may be cooled as found appropriate. The solution 72 may be introduced into the cylindrical dielectric element 44' by means of a hollow electrode 42' (as shown) or may be introduced by any suitable means, not shown. The solution 72 may be removed by any suitable means, part of which may be the conduit 74.

Concentric with the dielectric element 44', is a cylindrical electrode 40' to which a suitable alternating potential, as described, is applied as at the terminal 52. Surrounding the electrode 40' is a cooling jacket 46' to which cooling fluid may be introduced at the connection 75 and removed at the connection 76. The temperature and rate of flow of the cooling solution to the cooling jacket 46' will be at a rate and a temperature to maintain the electrode 40' below the condensation temperature of the particular monomer or low n-mer to be deposited and polymerized.

As shown in the FIGURE 5, the monomer vapor may be introduced by way of a funnel arrangement 78 which is so shaped so as to direct the monomer vapor along the area between the outside of the dielectric element 44' and the inside of the electrode 40'. As shown in the FIGURE 5, a coating of polymerized material (somewhat exaggerated in thickness) has started to build up on the electrode 40' and the electrode 40' may be advanced downwardly by any suitable means (not shown) so that the process may be continuous with the condensation and polymerization continuing along the inner walls of the substrate or electrode 40'. If desired, the electrode 40' could be of a discrete length and serially inserted and subsequently removed.

Figure 7:
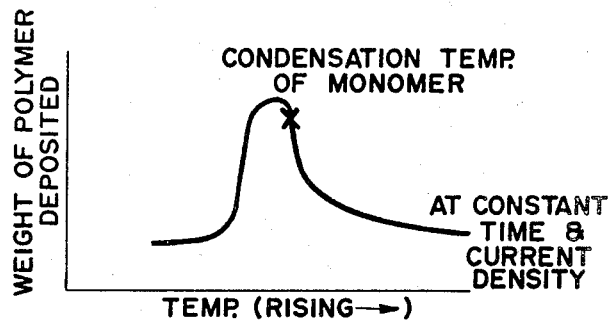
FIGURE 7 is a graph of the weight of polymer deposited versus temperature at a constant time and current density and further illustrating the condensation temperature of the monomer that is vaporized and then polymerized.
Figure 8:
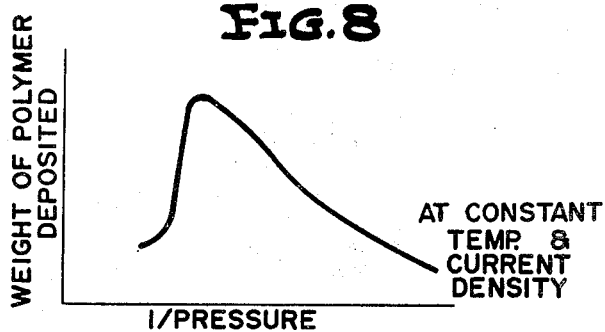
FIGURE 8 is a graph of weight of the polymer deposited versus the reciprocal of the pressure at a constant temperature and current density.
Figure 9:
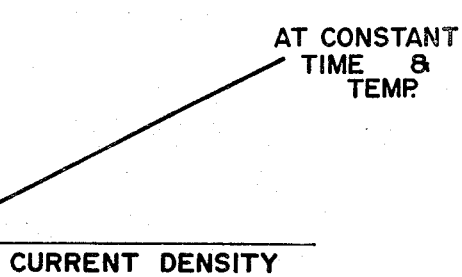
FIGURE 9 is a graph of the weight of the polymer deposited versus the current density, depicted at a constant time and temperature.

The FIGURES 7, 8 and 9 illustrate the weight of the polymer formed and deposited upon the substrate or electrode versus the temperature, reciprocal of the pressure, and current density, respectively. With reference to the FIGURE 7, the abscissa has been selected for the temperature while the ordinate shows the weight of the polymer formed and deposited upon the desired surface area. At constant time and current density, the curve is generally an inverted U with the maximum weight being formed at or near the condensation temperature of the monomer, as so indicated upon the curve. In accordance with the principles of this invention, the substrate or electrode would be at a temperature slightly less than the condensation temperature of the monomer so that a sufficient quantity of monomer is available for the polymerization reaction brought about principally through the activation by the electrical discharge.

In the FIGURE 8, the reciprocal of the pressure has been plotted along the abscissa whereas the ordinate continues to be the weight of the polymer deposited. At a constant temperature and current density, the curve is similar to the curve of FIGURE 7 and shows a maximum deposition at the pressure at which condensation occurs at the temperature of the electrode or substrate to be coated.

With reference to the FIGURE 9, the current density has been shown on the abscissa and the ordinate continues to depict the weight of the polymer formed and deposited upon the substrate. At a constant temperature and exposure time, the curve will be seen to be substantially linear so that after the desired weight of the polymer is determined, the optimum current density can be selected.

In the operation of the apparatus of the FIGURE 3 whether with the plane parallel electrodes of the FIGURE 4 or the concentric cylindrical electrodes of the FIGURES 5 and 6, a number of parameters are available which may be varied and adjusted so as to achieve maximum performance of the system. It is mandatory, of course, that the first consideration be that a polymerized coating be formed about the substrate which has a high degree of adherence to the substrate under severe conditions of flexing, such flexing as may occur if the substrate is subsequently formed or distorted by mechanical means. It is further desirable, that the polymerized coating be esthetically acceptable as well as economically produced. A number of parameters which are available are the pressure, electrode spacing, the geometry of the electrodes, the temperature of the electrodes during a run, the voltage, the time interval the voltage is applied, the frequency of the applied voltage, the current density, the type of monomer to be condensed and polymerized, and the rate of the gas flow between the electrodes. Each of the foregoing will be discussed in some detail.

Unlike the glow discharge polymerization, polymerization as practiced by the present invention may be conducted at atmospheric pressure. If the system is relieved from the evacuation required for below atmospheric pressures, then great economies may be effected since the pumping equipment may be simplified and little time is lost in waiting for the system to attain stability at the low pressure. If a range of pressures is to be established, the range of pressure for polymerization during the electrical discharge is from 500 mm. to 1000 mm. which includes the partial pressures of the monomer and any other gas in the system.

In regard to electrode spacing, if the parallel plane electrodes of the FIGURE 4 are employed with the system, then the electrode spacing may be varied from 1 mm. to 20 mm. In general, the greater the spacing, the greater the voltage required to maintain the discharge. If concentric cylindrical electrodes are employed such as those shown in the FIGURES 5 and 6, then the spacing would be substantially the same as for the parallel plane electrodes. However, if the higher spacing range is exceeded to any great degree, then the discharge may degenerate into the heavy current region.

The control of the temperature of the electrodes is a salient feature with the present invention. If the electrode or substrate on which deposition of the polymer is desired is maintained slightly below the condensation temperature of the monomer or n-mer at the particular pressure that is selected, then the monomer will condense upon the electrode and provide a sufficient quantity of monomer or n-mer for polymerization. If the temperature of the electrode is above the condensation temperature of the selected monomer or n-mer, then very little monomer would be adsorbed on the surface of the substrate leading to low coating deposition rates. On the other hand, if the temperature of the electrode is much lower than the condensation temperature of the selected monomer at the desired pressure, then too great a coating of monomer is condensed upon the substrate and may be condensed to the point that the condensed monomer actually drips from the substrate. In addition, if too great a coating of monomer is condensed upon the substrate or electrode, then after the polymerization reaction caused by the discharge has commenced only the surface molecules may become polymerized with the result that the molecules close to the surface or adsorbed upon the surface of the substrate do not become polymerized so that the coating has little adherence to the substrate. In addition, a very low molecular weight compound may be formed as a part of the coating, the low molecular weight compound subsequently evaporating and thus leaving a lower coating weight than desired. Accordingly, the temperature of the electrodes may be maintained as low as —195° C. to as high as 220° C. according to the monomer or n-mer to be condensed. The electrode to receive the coating may be maintained at a temperature in the range of 0° to 10° C. below the condensation temperature of the monomer to be polymerized and for the best results, the temperature of the electrode should be at approximately 1 to 5° C. below the condensation temperature of the monomer or n-mer.

Since the present invention employs a dielectric barrier about one of the electrodes, a higher voltage is usually employed and a voltage in the range of 5,000 volts to 50,000 volts (RMS) is satisfactory to maintain the voltage in the spark discharge region. As used with the dielectric, a frequency of 3,000 cycles to 100,000 cycles would be employed and may be applied to the electrodes for a time range of 0.1 second to 10 minutes. As set forth subsequently in the experiments, optimum voltage characteristics were determined to yield maximum results. With the foregoing, a current density of 10 microamps/cm.$^2$ to 4 milliamps/cm.$^2$ would be obtained.

In theory, the types of monomers that may be successfully employed with the present invention encompasses a very broad range. Any vaporizable compound containing carbon and at least one hydrogen, or silicon and at least one hydrogen, or mixtures of vaporizable compounds in which the mixture contains carbon and at least one hydrogen, or silicon and at least one hydrogen, may be employed. Monomers such as vinyl chloride, styrene, methylmethacrylate, allyl methacrylate, ethylene, divinyl benzene and butadiene are found to produce coatings having high adherence and esthetic qualities. As a practical matter, the production of coatings from compounds having very high condensation temperatures (styrene B.P. is +146° C.) and very low condensation temeprature ethylene B.P. is —102.5° C.) is not as successful as employing compounds having condensation temperatures near room temperatures or somewhat below. This is due to the economic necessity of maintaining the very high or very low temperature during the coating process.

The rate of the vaporized monomer flow between the electrodes would be at a rate sufficient to maintain a substantially constant pressure between the electrodes.

It will be intuitively clear to those skilled in the art, how the foregoing parameters may be selected and applied to the apparatus of the FIGURE 4. For example, the substrate or electrodes of the desired configuration would be placed within the chamber 36 if a pressure other than atmospheric is desired. In the event that atmospheric pressure is to be maintained, then the bell jar 36 would not be needed. After the desired pressure is reached, the monomer or n-mer selected and the cooling fluid circulated to cause the electrodes to reach a temperature below the condensation temperature of the selected monomer, the monomer is then introduced so that condensation of the monomer on the electrode surfaces commences. A suitable power supply (not shown) would apply a potential to the electrical conductors 52 and 53 which are coupled to the electrodes, care being maintained to cause the system to remain in the discharge region as set forth. The existence of the electric field would cause incoming monomer molecules to become ionized or become activated and to be propelled against the electrode (the negative electrode during the alternating voltage half cycle) which then produces a polymerization of the condensed molecules on the electrode. After the run has progressed for the desired length of time, the voltage would be reduced to zero, the system brought to atmospheric pressure if not already there, and the substrate or electrode bearing the polymerized coating removed.

The foregoing conditions are set forth in the following experiments which were conducted in accordance with the concepts of the present invention.

EXAMPLE I

At atmospheric pressure (760 mm. Hg), the condensation temperature of 1,3-butadiene is −4.5° C. 1,3-butadiene is introduced at atmospheric pressure between concentric electrodes separated by a 2.8 mm. gap. The outside diameter of the center electrode is 59 mm. and the inside diameter of the outer electrode is 64.6 mm. The electrodes are maintained at a temperature in the ranges of −5.5° C. to −10.5° C. A voltage of 10K volts (RMS) at a frequency of 10K c.p.s. will produce a current density between 1.5 and 2.0 ma./in$^2$. With a monomer flow rate in the range 10 to 15 cc./min. and a discharge time of 1 minute, a coating having high adherence to the substrate and excellent appearance is produced.

EXAMPLE II

The condensation temperature of vinyl chloride at atmospheric pressure is −13.8° C. Using the same parameters as those set forth in Example I except that the temperature of the electrode to receive the substrate is maintained at between −14.8° C. and −19.8° C., excellent coatings are obtained having a high degree of adherence to the substrate under conditions of flexing and bending and the coatings are substantially uniformly clear and esthetically acceptable.

EXAMPLE III

The condensation temperature of styrene at atmospheric pressure is +146° C. Styrene is introduced between concentric electrodes at atmospheric pressure, the electrodes being maintained at approximately 143° C. (±2° C). The electrode spacing is 5.0 mm., the potential is 20K volts at a frequency of 50K c.p.s. After an exposure time of approximately one minute, acceptable coatings having good adherence and esthetical quality are obtained.

EXAMPLE IV

At atmospheric pressure, the condensation temperature of ethylene is −102.5° C. Ethylene is introduced between concentric cylindrical electrodes at atmospheric pressure having a separation of 10 mm. The electrodes are maintained at a temperature of −105.5° C. (±2° C.) and a potential of 40K volts is applied at a frequency of 100K c.p.s. The exposure time is approximately one minute and at a flow rate sufficient to maintain atmospheric pressure between the electrodes. Good coatings are obtained upon the substrate electrodes.

EXAMPLE V

The conditions of this Example are substantially identical to those of Example I except that the electrode temperature is maintained at approximately −2.5° C. This temperature is above the condensation temperature of a 1,3-butadiene so that there is little tendency for the 1,3-butadiene to condense upon the electrodes. As a result, little, if any, 1,3-butadiene condenses upon the electrodes, which proves the feasibility of the invention, i.e., maintaining the electrode (or electrodes) to be coated at a temperature slightly below the condensation temperature of the monomer or n-mer to be polymerized to increase polymerization rates in a spark discharge.

According to the teaching of the present invention, it has been established that increased polymerization rates are achieved if the substrate or electrode to receive the coating is maintained at a temperature slightly below the condensation temperature of the monomer or n-mer selected. Gases or vapors are always adsorbed at a thickness of a few molecules on the surface of a substrate exposed to the gas or vapor. The lowering of the temperature of the substrate will generally increase this thickness due to the greater condensation of the monomer upon the substrate. The invention is practiced most advantageously at atmospheric pressure and the temperature of the substrate or electrode to receive the coating must be carefully controlled. If the substrate is maintained at too low a temperature with respect to the condensation temperature of the monomer, then too much monomer condenses upon the substrate and polymerization of all of the condensed material is usually not achieved. Accordingly, the coatings would be gummy and perhaps, of low molecular weight. On the other hand, if the electrode or substrate is maintained at too high a temperature with regard to the condensation temperature of the monomer, then substantially no monomer condenses upon the substrate and the thickness of the coating is only achieved through the activated ions which are deposited upon the electrode during the electrical discharge. It is generally accepted that an ion or activated molecule produced by the discharge of the present invention impinges upon the electrode or substrate at a high velocity. A portion of this energy of the ion or activated molecule initiates a polymerization with the adsorbed, unactivated gas or vapor condensed upon the substrate. The major portion of the energy is dissipated as heat at the electrode or substrate, thus raising the temperature of the electrode or substrate. This rise in temperature decreases the thickness of the adsorbed gas or vapor layer, and thus will decrease the number of unactivated molecules available for polymerization. However, due to the circulation of a fluid through the electrode or substrate to be coated, the temperature of the material to be coated is carefully controlled so that sufficient molecules are available on the material to be polymerized.

It will be observed from the foregoing Examples I through IV that excellent coatings were obtained due to the temperature maintained on the electrode or substrate to be coated. In Example V it is noted that the substrate or electrode to be coated is maintained at a temperature above the condensation temperature of the monomer or low n-mer and that little or no coating of the electrode or substrate was achieved.

Thus, the present invention may be embodied in other specific forms without departing from the spirit and the essential characteristics of the invention. The present embodiment is, therefore, to be considered in all respects as illustrative, the scope of the invention being indicated by the appended claims rather than the foregoing description, and all changes which come within the meaning and range of the equivalency of the claims are, therefore, intended to be embraced therein.

What is claimed is:

1. A coating process comprising the steps of supporting a pair of electrodes in spatial relationship, at least one of which is to receive a coating, maintaining a pressure between the electrodes of at least atmospheric, maintaining the electrodes to receive the coating at a temperature below the condensation temperature of an activatable gas to be polymerized, introducing the activatable gas between the electrodes, a portion of the gas condensing upon the electrodes to be coated, and applying an electrical potential between the electrodes so as to produce a corona discharge therebetween for causing a polymerized coating of the activatable gas upon the electrodes to be coated.

2. The process of claim 1 wherein the pressure maintained between the electrodes ranges from atmospheric to 1000 mm.

3. The process of claim 1 wherein the electrodes are maintained at a temperature in the range of 0° to 10° C. below the condensation temperature of the gas.

4. The process of claim 1 wherein the electrical potential applied across the electrodes has a frequency between 3,000 to 10,000 cycles.

5. The process of claim 1 wherein the electrical potential applied across the electrodes has an amplitude of 5,000 to 50,000 volts.

6. The process of claim 1 wherein the activatable gas is selected from the group consisting of vinylchloride, styrene, methylmethacrylate, allyl methacrylate, ethylene, divinyl benzene, and butadiene.

7. The process of claim 1 wherein one of the electrodes is surrounded by a dielectric material, the non-surrounded electrode being designated as the electrode to receive the coating.

References Cited

UNITED STATES PATENTS

| | | | |
|---|---|---|---|
| 2,932,591 | 4/1960 | Goodman | 117—201 |
| 3,068,510 | 12/1962 | Coleman | 117—93 X |
| 3,205,162 | 9/1965 | MacLean | 204—168 X |
| 3,321,390 | 5/1967 | Weber | 117—93.1 X |

FOREIGN PATENTS 933,577  8/1963  Great Britain.

OTHER REFERENCES

Coffman et al.: "Corona Chemistry," from Scientific America, June 1965, pp. 91–98.

ALFRED L. LEAVITT, *Primary Examiner.*

J. H. NEWSOME, *Assistant Examiner.*

U.S. Cl. X.R.

204—170; 117—132